US011841216B2

(12) United States Patent
Clayton et al.

(10) Patent No.: US 11,841,216 B2
(45) Date of Patent: Dec. 12, 2023

(54) METHODS AND APPARATUS FOR FREIGHT DIMENSIONING USING A LASER CURTAIN

(71) Applicant: Zebra Technologies Corporation, Lincolnshire, IL (US)

(72) Inventors: Richard Mark Clayton, Manorville, NY (US); Patrick Martin Brown, North Medford, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 296 days.

(21) Appl. No.: 15/966,083

(22) Filed: Apr. 30, 2018

(65) Prior Publication Data

US 2019/0331474 A1    Oct. 31, 2019

(51) Int. Cl.
| | |
|---|---|
| *G01B 11/04* | (2006.01) |
| *G06T 7/62* | (2017.01) |
| *G06T 7/521* | (2017.01) |
| *G01B 11/00* | (2006.01) |
| *G06T 7/00* | (2017.01) |
| *G01B 11/02* | (2006.01) |
| *G06Q 10/083* | (2023.01) |

(52) U.S. Cl.
CPC ............ *G01B 11/04* (2013.01); *G01B 11/002* (2013.01); *G01B 11/022* (2013.01); *G06Q 10/083* (2013.01); *G06T 7/0004* (2013.01); *G06T 7/521* (2017.01); *G06T 7/62* (2017.01)

(58) Field of Classification Search
CPC ..... G01B 11/04; G01B 11/002; G01B 11/022; G06T 7/62; G06T 7/521; G06T 7/0004; G06Q 10/083; G06Q 20/145; G06Q 2250/00; G06Q 2250/05; G06Q 10/08

USPC ............................ 348/135; 705/330, 335, 33
See application file for complete search history.

(56) References Cited

U.S. PATENT DOCUMENTS

| | | | | |
|---|---|---|---|---|
| 6,798,528 B1* | 9/2004 | Hartman | ................ | G01B 11/04 356/625 |
| 7,137,556 B1* | 11/2006 | Bonner | ................... | B07C 3/14 235/462.08 |
| 2004/0240754 A1* | 12/2004 | Smith | ................... | G01B 11/00 382/286 |

(Continued)

FOREIGN PATENT DOCUMENTS

EP    2439487 A1 *    4/2012    ............ G06T 7/564

*Primary Examiner* — Kathleen M Walsh (57) ABSTRACT

Methods and systems are provided for dimensioning a moving freight in motion along a path. An example system includes a plurality of laser line generators configured to emit coplanar laser beams forming a laser curtain oriented perpendicular to the floor and angled towards the direction of the path of the moving freight. A camera is configured to capture a series of two-dimensional images of the freight as it passes through the laser curtain. Additionally a positioning sensor is configured to detect the position and orientation of the moving freight as it passes through the laser curtain. A computing device in communication with the camera and the positioning sensor correlates each successive two-dimensional image with each corresponding position and orientation of the freight to obtain a composite three-dimensional shape of the freight. Furthermore, the computing device processes the composite three-dimensional shape of the freight to dimension the freight.

20 Claims, 10 Drawing Sheets

(56) References Cited

U.S. PATENT DOCUMENTS

| | | | |
|---|---|---|---|
| 2010/0091094 A1* | 4/2010 | Sekowski | B66F 9/0755 |
| | | | 348/50 |
| 2014/0379604 A1* | 12/2014 | Bodenhamer | G06Q 10/083 |
| | | | 705/330 |
| 2016/0070981 A1* | 3/2016 | Sasaki | B60R 1/00 |
| | | | 348/148 |
| 2017/0148102 A1* | 5/2017 | Franke | G06Q 10/20 |
| 2017/0150129 A1* | 5/2017 | Pangrazio | H04N 5/247 |
| 2017/0227629 A1* | 8/2017 | Sorensen | G01S 7/51 |
| 2017/0227674 A1* | 8/2017 | Sorensen | G01B 11/04 |
| 2017/0228885 A1* | 8/2017 | Baumgartner | G01B 11/04 |
| 2017/0287186 A1* | 10/2017 | Saito | G06T 7/521 |
| 2018/0068266 A1* | 3/2018 | Kimmani | G06Q 10/0833 |
| 2018/0121864 A1* | 5/2018 | Sullivan | G07C 5/0866 |
| 2018/0231371 A1* | 8/2018 | Galin | G01C 11/30 |
| 2018/0288355 A1* | 10/2018 | Minami | G06T 3/4038 |

* cited by examiner

METHODS AND APPARATUS FOR FREIGHT DIMENSIONING USING A LASER CURTAIN

BACKGROUND

In an industrial environment, freight is frequently moved from warehouses or like venues into containers for transport by land, rail, water, and air, etc. Recipients of the freight are typically charged by the dimensions (i.e., volume) of the freight. Knowing the dimensions of the freight is also useful for determining the order in which the freight is to be loaded, and to fill as much of the container as possible for efficient handling and distribution.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of this disclosure, and explain various principles and advantages of those embodiments.

The apparatus and method components have been represented where appropriate by conventional symbols in the drawings, showing only those specific details that are pertinent to understanding the teachings of this disclosure so as not to obscure the disclosure with details that will be readily apparent to those of ordinary skill in the art having the benefit of the description herein.

DETAILED DESCRIPTION

One known method for dimensioning freight in this setting is via a laser curtain system, in which two-dimensional images of "slices" of the freight are captured as the freight passes through a plane formed by a series of parallel lasers originating from a ceiling or otherwise above the freight, and oriented perpendicularly to the path of the freight. The two-dimensional images are then combined to obtain a composite three-dimensional shape of the freight.

However, using this known method, the front face of a freight passing through the laser curtain cannot be measured, because as the freight passes through the laser curtain, the front face is parallel to the plane of the laser curtain. That is, a two-dimensional image "slice" of the front face will indicate the edges of the front face but will not include any information about the front face itself. Moreover, using this known method, the two-dimensional image slice will not include information about the sides of the freight. Accordingly, using this known method, anomalies of the front face and sides of the freight (such as damage) cannot be detected.

The present application provides systems and methods for dimensioning a moving freight in motion along a path using a diagonal laser curtain. An example dimensioning system disclosed herein includes a laser curtain system comprising a plurality of laser line generators configured to emit coplanar laser beams that form a laser curtain oriented perpendicular to the floor and angled towards the direction of the path of the moving freight. The laser curtain system also includes a camera configured to capture a series of two-dimensional images associated with the moving freight as the moving freight passes through the laser curtain. The dimensioning system further includes a positioning sensor operative to detect the position and/or orientation of the moving freight as each of the two-dimensional images is captured, as well as a computing device in communication with the laser curtain system and the positioning sensor. The computing device is operative to correlate each successive two-dimensional image of the moving freight with a corresponding position and/or orientation of the moving freight to obtain a composite three-dimensional shape of the moving freight, and process the composite three-dimensional shape of the moving freight to dimension the moving freight.

Advantageously, because the diagonal laser curtain is oriented perpendicular to the floor and angled towards the direction of the path of the moving freight, no face of a cubic moving freight will be parallel to the laser curtain using the systems and methods disclosed herein. Therefore, the two-dimensional images captured by the camera collectively contain data related to all faces of the cubic moving freight. Accordingly, when the two-dimensional images are correlated to create the composite three-dimensional shape of the moving freight, dimensions of the freight developed using the diagonal laser curtain can be obtained with greater accuracy. Furthermore, dimensions of the freight can be compared to expected dimensions of the freight to evaluate damage to the freight or to determine whether a customer was correctly charged for the actual volume of the freight.

Figure 1:
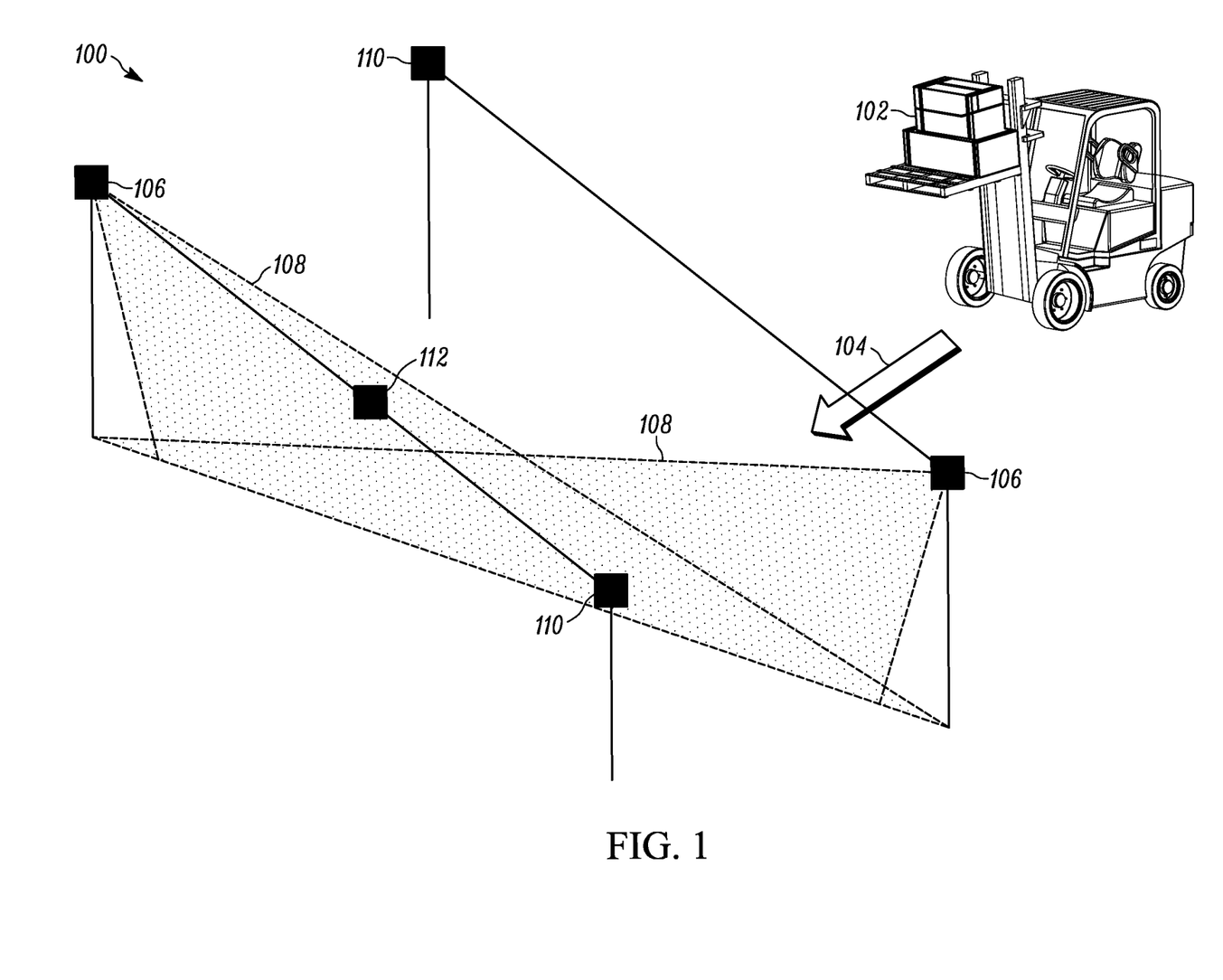
FIG. 1 illustrates an example moving freight passing through a diagonal laser curtain.

FIG. 1 illustrates an example moving freight passing through a diagonal laser curtain. In particular, FIG. 1 depicts an example dimensioning system 100 for dimensioning a moving freight 102 in motion along a path 104. In some instances, the freight 102 is transported along the path 104 via a conveyor belt or similar mechanical means. In other instances, industrial vehicles, such as forklifts, lift and move the freight 102 along the path 104. Furthermore, in some instances, the path 104 is constrained or otherwise known (e.g., a conveyor belt moves the freight 102 along a set path), while in other instances the path 104 is unconstrained or unknown (e.g., a forklift operator moves the freight 102 along a path 104 selected by the forklift operator).

The example dimensioning system 100 of FIG. 1 includes a laser curtain system, which includes one or more laser line generators 106. The laser line generators 106 emit a plurality of coplanar laser beams that fan out to form a laser curtain 108 that is perpendicular to the floor and angled towards the direction of travel of the freight 102 (i.e., a diagonal laser curtain). That is, the laser curtain 108 is a plane of laser light that the freight 102 passes through along the path 104. In some embodiments, the angle of the laser curtain 108 to the direction of travel of the moving freight 102 is a 45-degree angle, or an angle between 30 and 60 degrees. Of course, the angle of the laser curtain 108 to the path 104 may be any suitable angle in various embodiments.

The laser curtain system further includes one or more cameras 110 configured to capture a series of two-dimensional images of the moving freight 102 as the moving freight 102 passes through the laser curtain 108. For example, the cameras 110 are placed at the same height as the laser line generators 106, with the observation axes of each camera 110 oriented towards the plane of the laser curtain 108. As shown in FIG. 1, for instance, the laser curtain 108 is in one diagonal plane and the cameras 110 are positioned at each end of the opposite diagonal. As the freight 102 moves through the laser curtain, the cameras 110 capture a series of images depicting the laser light surrounding the freight 102 at a series of times. Accordingly, the laser light captured in each image traces out the edges of the portion of the freight 102 passing through the laser curtain 108 at the time each image is captured, with each successive image representing a successive "slice" of the freight 102. In one example, the cameras 110 are monochrome cameras with a light filter that filters out all any light not matching the wavelength (color) of the laser emitted by the laser line generators 106. Accordingly, the only light captured by the cameras 110 is the laser tracing out the edges of each "slice" of the freight 102.

Generally speaking, the cameras 110 capture images of the moving freight 102 at periodic intervals or at otherwise known times. For example, the cameras 110 capture one hundred images per second, two hundred images per second, etc. In some instances, the frequency of the cameras' 110 image capture is related to the speed of the moving freight 102. For example, the cameras 110 may capture images with a frequency sufficient to obtain one image for each inch the moving freight 102 travels. In other words, the cameras 110 capture images more frequently when the moving freight 102 passes through the diagonal laser curtain 108 at a higher speed, but less frequently when the moving freight 102 passes through the diagonal laser curtain 108 at a lower speed, in some embodiments. In the illustrated example, a time stamp is recorded each time an image is captured by the cameras 110.

Additionally, the dimensioning system 100 includes a positioning sensor 112, e.g. (such as, e.g., a camera, motion detector, or other suitable image detector), positioned above the path 104 of the moving freight 102 and oriented toward the path 104 of the moving freight 102, and configured to detect the position, orientation and/or speed of the moving freight 102 as it passes through the laser curtain 108. The positioning sensor 112 captures data indicative of a current position of the moving freight 102 corresponding to each image is captured by the cameras 110. In some examples, one or more tracking markers (not shown) are affixed to (or painted on, printed on, etc.) the moving freight 102, or on the forklift or other mechanism transporting the moving freight. By capturing data indicative of the current position and/or orientation of a tracking marker, the positioning sensor 112 can determine the position and/or orientation of the moving freight 102 by proxy. As another example, the positioning sensor 112 may capture images of the moving freight 102 to be analyzed to determine the position of the moving freight.

Additionally or alternatively, in some embodiments, the cameras 110 of the laser curtain system may be configured to detect the position, orientation, and/or speed of the moving freight 102.

Figure 2:
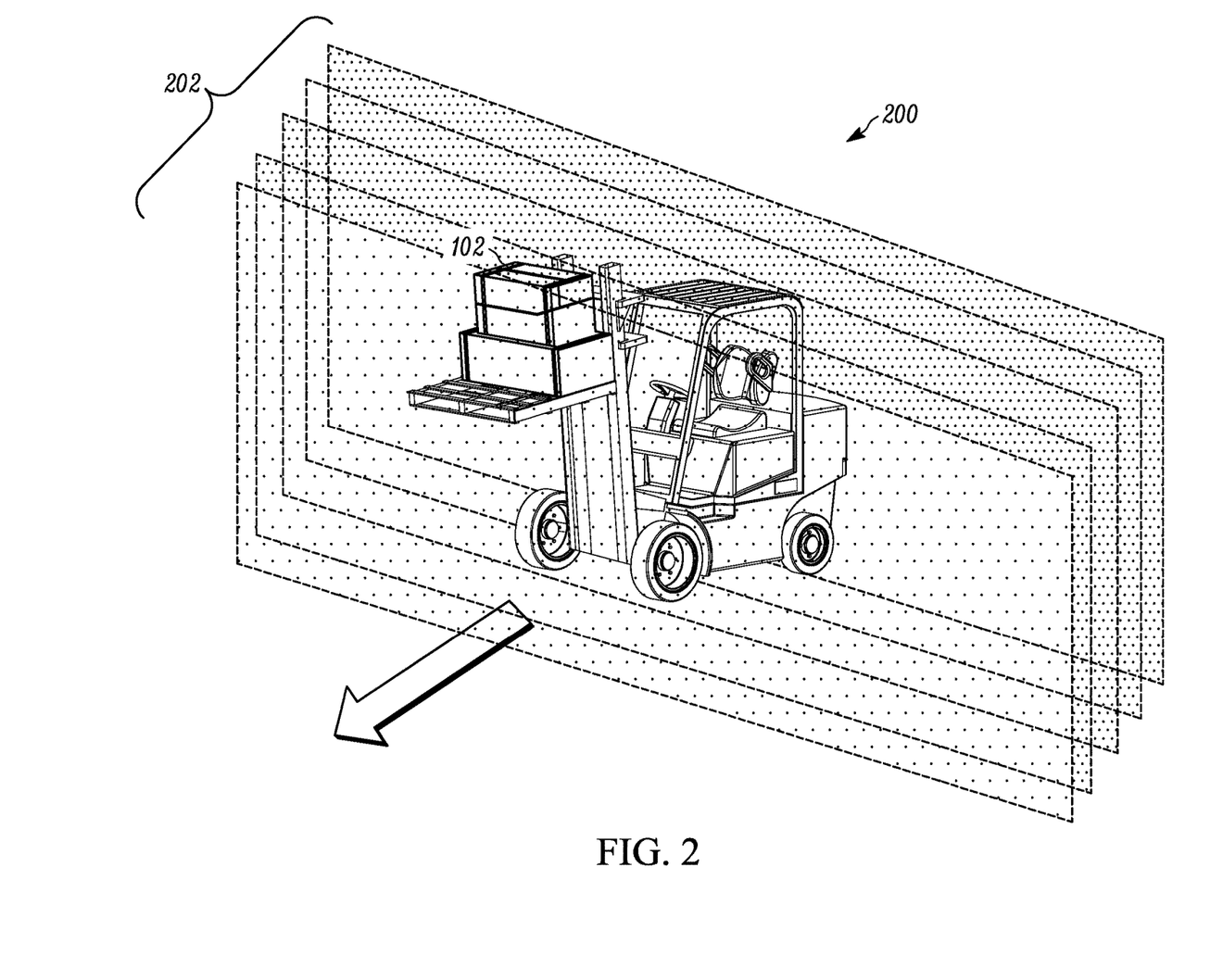
FIG. 2 illustrates example successive "slices" through a moving freight as it passes through a diagonal laser curtain.

FIG. 2 depicts a diagram 200 illustrating example successive image "slices" 202 through a moving freight 102 captured as it passes through the diagonal laser curtain 108. Five slices 202 are depicted in FIG. 2 for simplicity, however, any number of two-dimensional images may be captured in various embodiments. These slices 202 represent the portion of the moving freight 102 captured by the cameras 110 in each of the successive two-dimensional images. That is, the diagonal laser curtain 108 remains fixed in place as the freight 102 passes through at some speed, so each successive slice cuts through the freight 102 in a new location until the freight 102 has fully passed through the diagonal laser curtain 108.

Figure 3A:
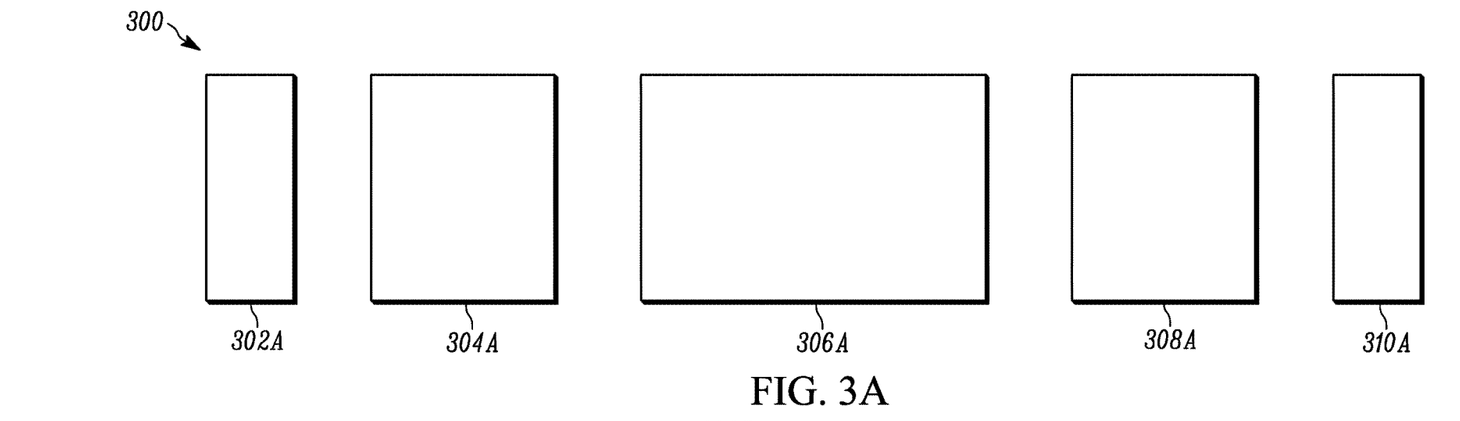
FIG. 3A illustrates example successive two-dimensional images of a moving freight as it passes through a diagonal laser curtain.

FIG. 3A illustrates example successive two-dimensional images 300 of the moving freight 102 as it passes through the diagonal laser curtain 108. For example, image 302A is the first two-dimensional image captured (e.g., at a first time, T1, shape 304A is the second two-dimensional image captured (e.g., at a second time, T2), image 306A is the third two-dimensional image captured (e.g., at a third time, T3), image 308A is the fourth two-dimensional shape captured (e.g., at a fourth time, T4), and image 310A is the fifth two-dimensional shape captured (e.g., at a fifth time, T5). While five two-dimensional images 300 of the moving freight 102 are shown in FIG. 3A for simplicity, any number of two-dimensional images may be captured in various embodiments.

Figure 3B:
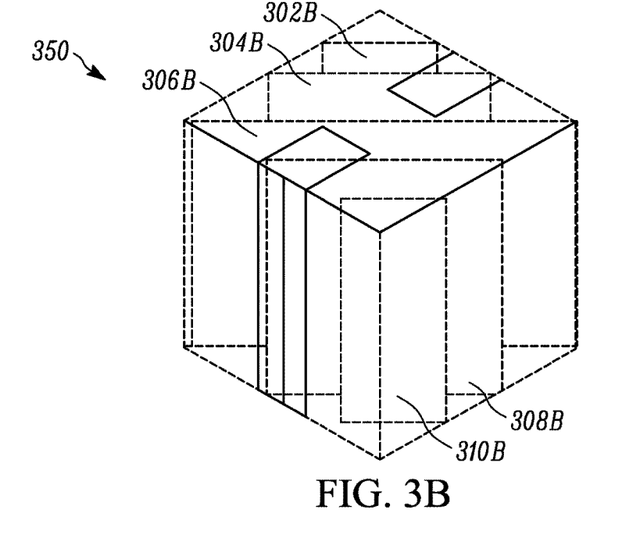
FIG. 3B illustrates an example three-dimensional shape of a moving freight obtained by correlating successive two-dimensional images of the moving freight.

FIG. 3B illustrates an example composite three-dimensional shape 350 of a moving freight 102 obtained by correlating successive two-dimensional images 300 of the moving freight 102. In this example, shapes 302B-310B shown in FIG. 3B correspond to images 302A-310A of FIG. 3A. Using the position and orientation of the moving freight 102 at each of the times when each of the successive two-dimensional images 300 of the moving freight are captured, shapes 302B-310B are correlated to create a composite three-dimensional shape 350 of the moving freight 102.

Accordingly, the composite three-dimensional shape 350 is processed to determine the dimensions and volume of the freight 102.

Figure 4:
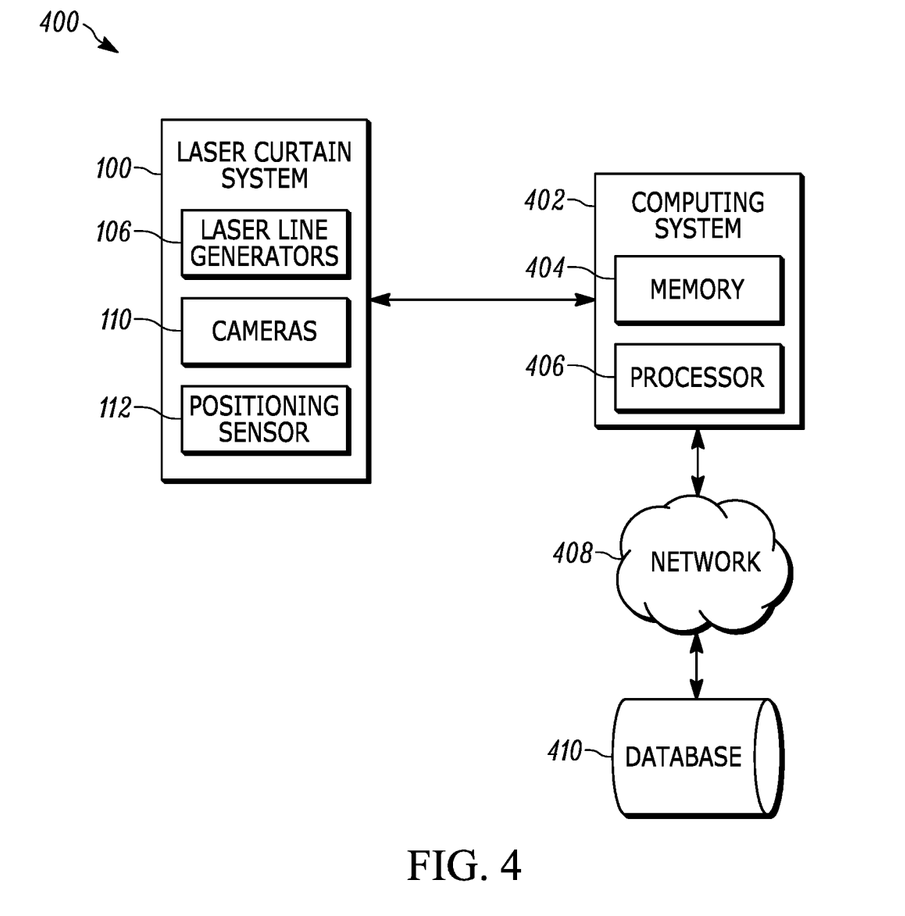
FIG. 4 is a block diagram of an exemplary dimensioning system for dimensioning a moving freight in motion along a path.
Figure 4A:
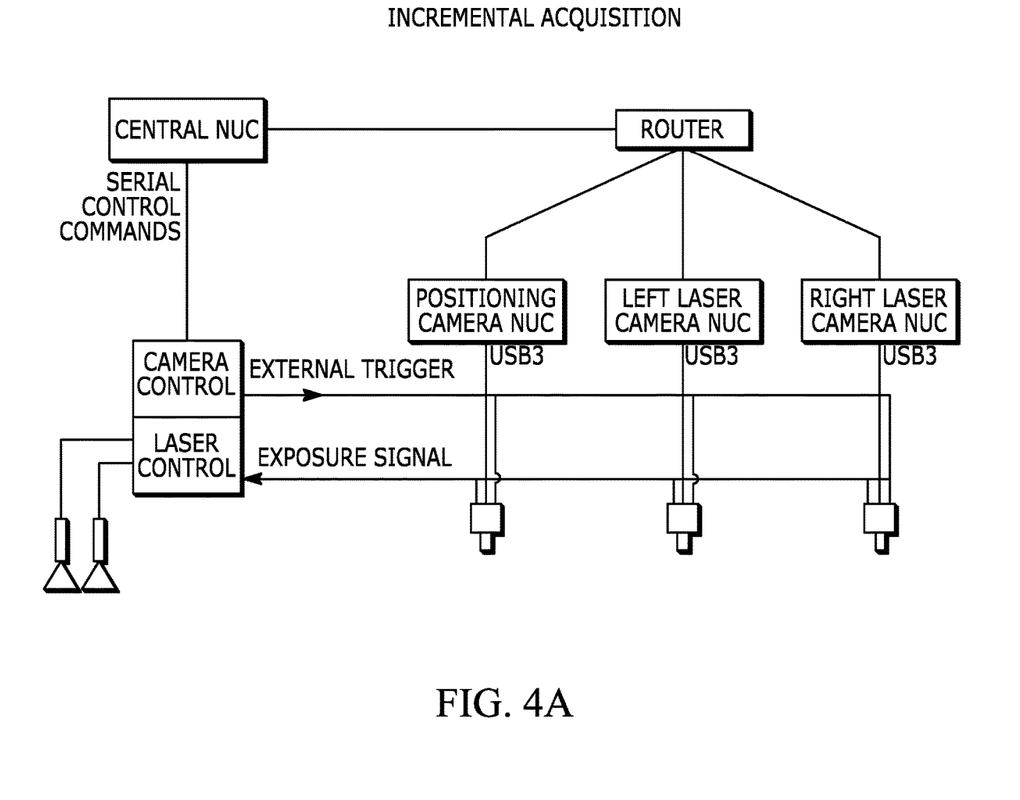
FIGS. 4A-4D are block diagrams of several exemplary dimensioning systems for dimensioning a moving freight in motion along a path.
Figure 4B:
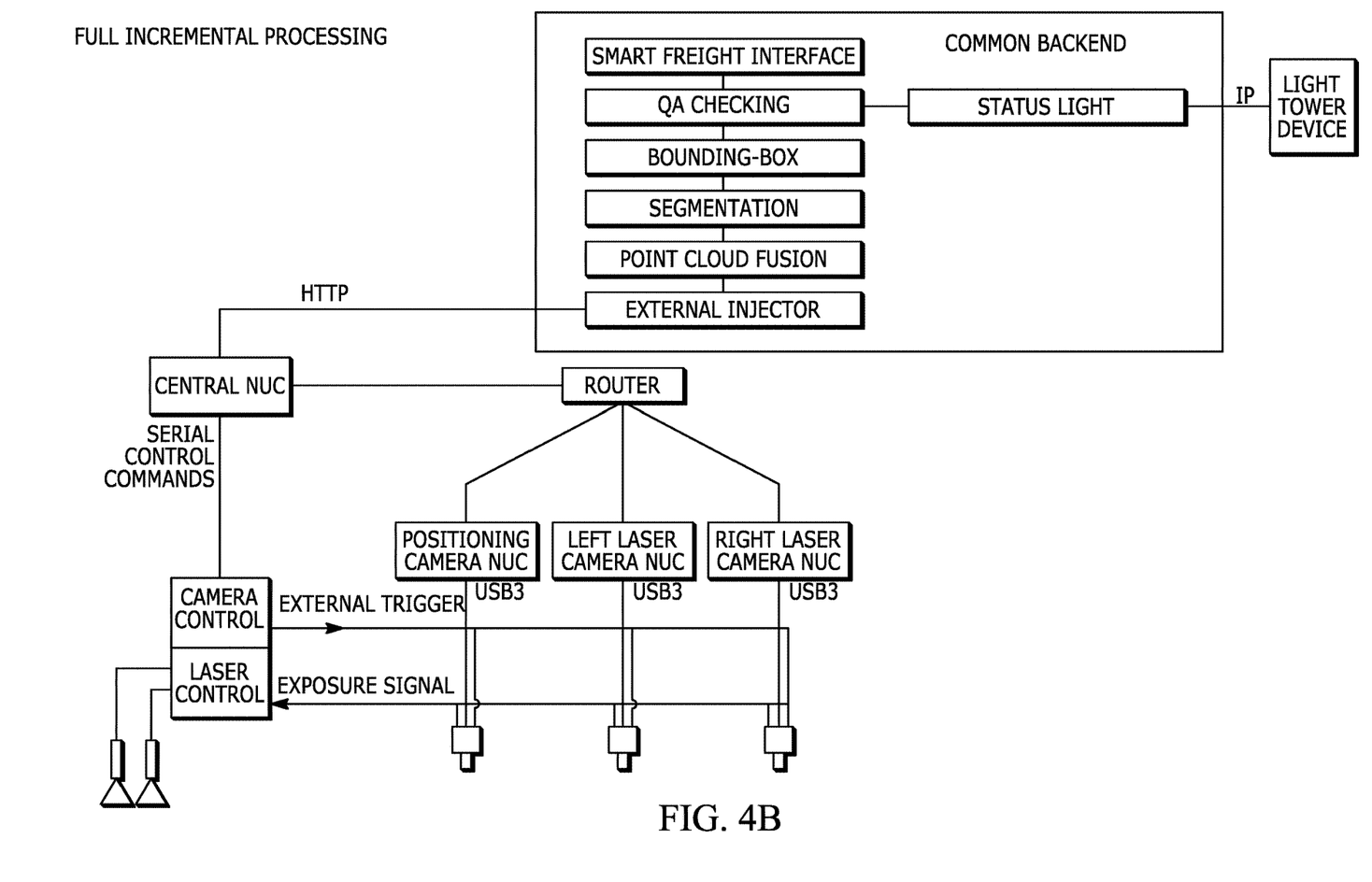
Figure 4C:
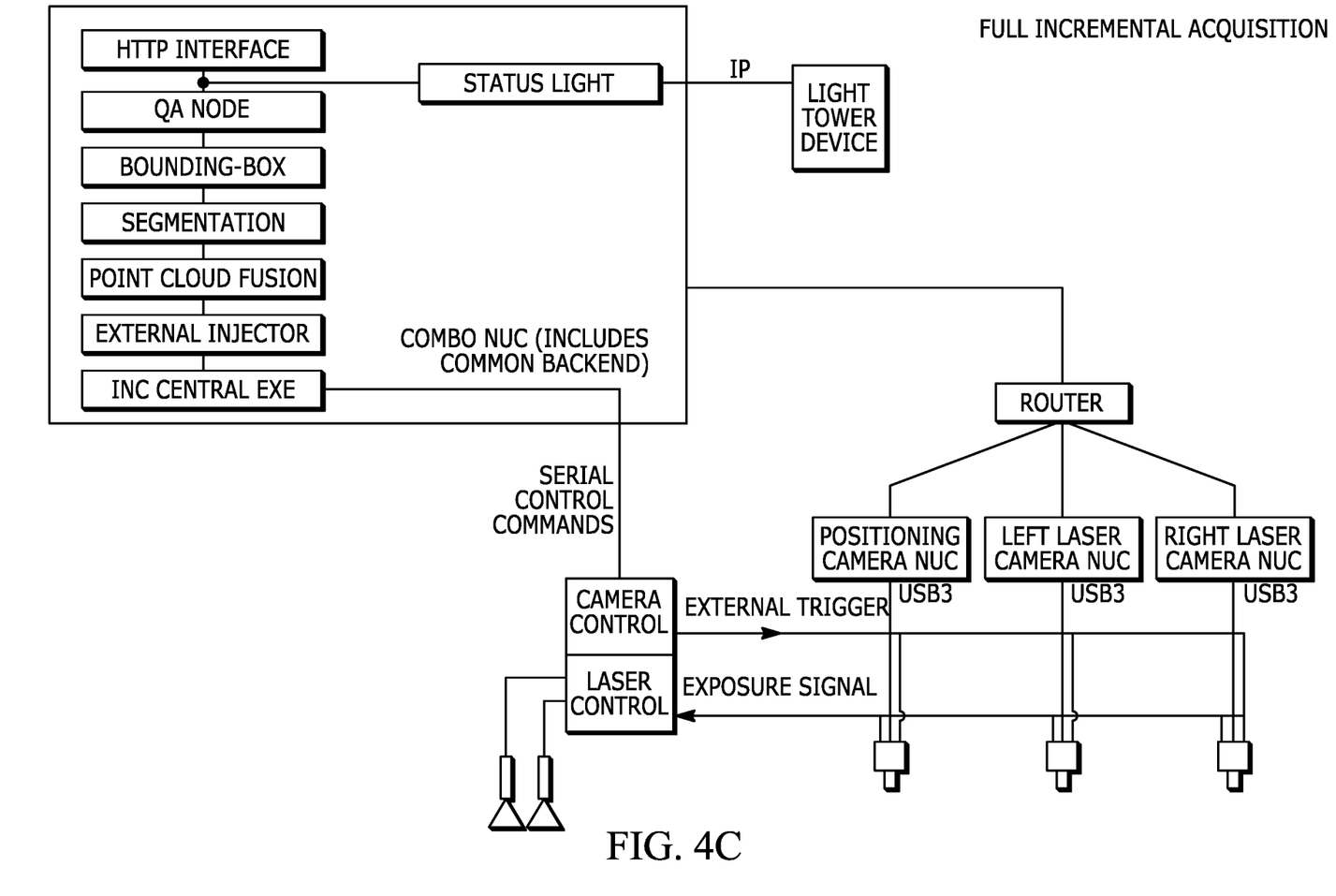
Figure 4D:
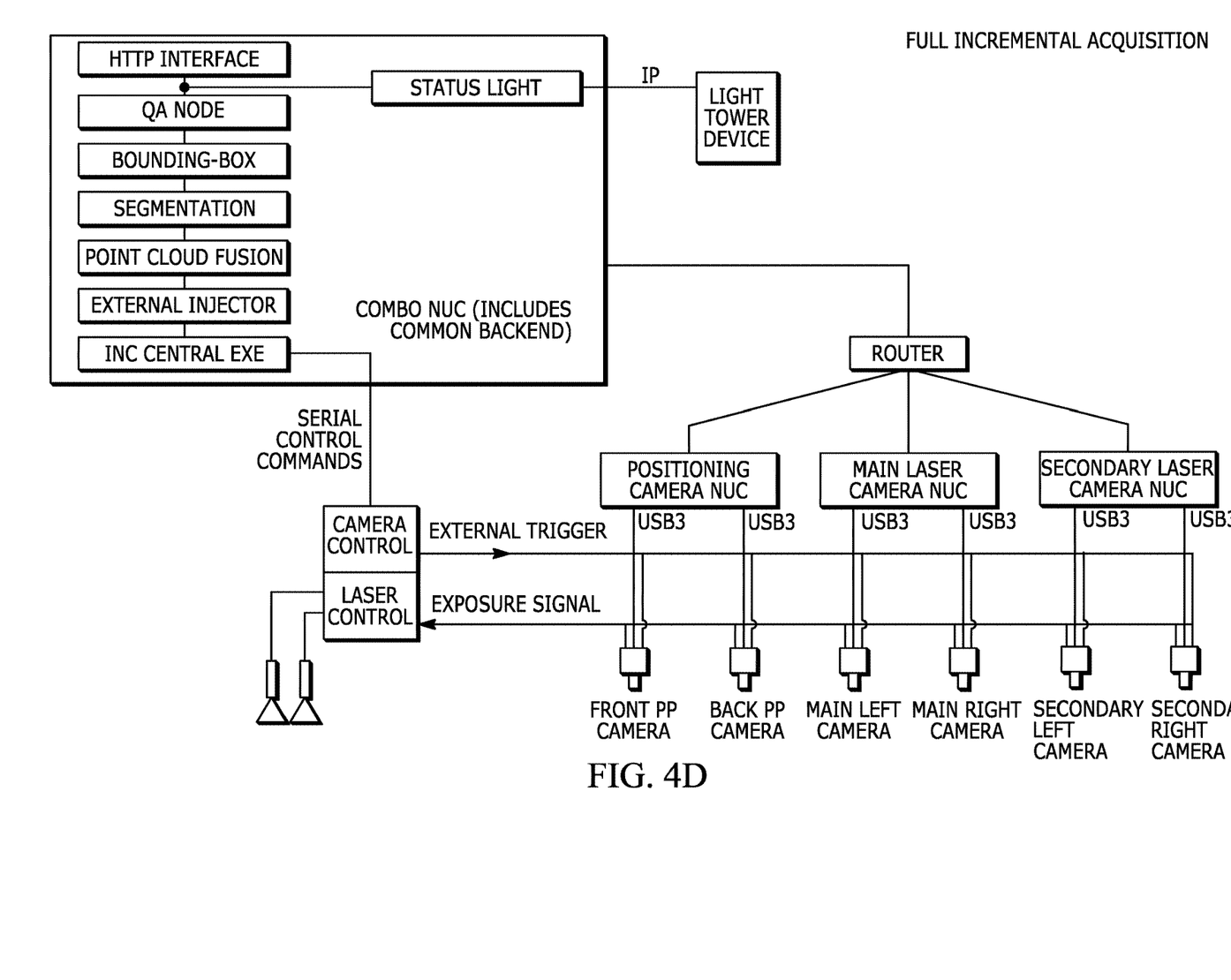

FIG. 4 is a block diagram of an overview of an exemplary dimensioning system 400 for dimensioning a moving freight 102 in motion along a path 104. The exemplary dimensioning system 400 includes the example laser curtain system 100 discussed above with respect to FIGS. 1-3 in communication with a computing system 402. The computing system 402 includes a memory 404 (e.g., volatile memory, non-volatile memory) and a processor 406 that interfaces with the laser curtain system 100 and the memory 404. The processor 406 interacts with the memory 404 to obtain, for example, machine-readable instructions stored in the memory 404. Additionally or alternatively, machine-readable instructions may be stored on one or more removable media (e.g., a compact disc, a digital versatile disc, removable flash memory, etc.) that may be coupled to the computing system 408 to provide access to the machine-readable instructions stored thereon. The machine-readable instructions stored on the memory 404 may include instructions for carrying out any of the methods described in greater detail below at FIGS. 5-8.

In some instances, the computing system 402 accesses, e.g., via a network 408, one or more databases 410. Generally, the database 410 stores data related to the moving freight 102. As one example, the database 410 stores expected dimensions or expected volumes of each freight. Additionally or alternatively, as another example, the database 410 stores data indicating customers associated with each freight, and/or shipping costs paid by customers associated with each freight. Of course, the database 410 may store any type of data related to dimensioning the moving freight 102. Furthermore, in some examples, the data described as being stored in database 410 is stored in the memory 404.

FIGS. 4A-4D are detailed block diagrams of several exemplary dimensioning systems for dimensioning a moving freight in motion along a path. As shown in FIGS. 4A-4D, a controller board (microcontroller based) includes camera control and laser control. The camera control includes an external synchronization signal to each camera, ensuring that each of the cameras capture images at exactly the same time. The central computer program specifies the camera frame rate that the controller signals to the cameras. The laser control of the controller board provides a signal to the lasers which determines when and how long the lasers are active.

The positioning NUCs (next unit of computing) shown in FIGS. 4A-4D receive high speed HD video from the positioning cameras that track the forklift position while the freight is crossing the laser line. A positioning camera points straight down to track markers (e.g., LED markers and retro-reflective dots) on the forklift roof to for precise tracking of the forklift. While in some instances, two markers (e.g., a left marker and a right marker) of the leading edge of the forklift roof are utilized, any number of markers may be used in various embodiments. The positioning NUCs process the video frames to locate any markers in the field of view. The marker positions are mapped from the 2D camera view into 3D positions (using the known height of the markers). This mapping corrects for camera non-linearities (e.g., barrel distortion.)

Also shown in FIGS. 4A-4D are at least two laser curtain cameras pointed at the laser curtain (e.g., one on each side). These cameras capture a video stream depicting the intersection of the laser curtain with the scene (floor, freight, forklift, etc.) In some instances, the laser curtain cameras may be filtered to only capture laser curtain light and not other forms of light in the environment (e.g., red filter to capture red light, etc.). For each laser curtain camera there is a laser camera NUC configured to process the video stream and identify the points where the laser curtain intersects the scene. The points of intersection are each mapped to a 3D point within the laser curtain.

The 3D marker points from the positioning NUC and the 3D points in the laser curtain from the laser camera NUC are sent to the central computer program (INC exe), which collects precise positioning point information and laser curtain point information to produce an overall point cloud for each forklift that is used to determine the dimensions of the freight. Specifically, in various embodiments shown in FIGS. 4A-4D, the 3D marker points and the 3D points in the laser curtain may be sent (from, respectively, the positioning NUC and/or the laser camera NUC), e.g., via a router, to a computing device (such as, e.g., a central NUC, a common back end, a combination NUC including a common back end, and/or a ROS system), storing the central computer program, As shown in shown in FIGS. 4A-4D, additional software applications stored in the memory of the computing device in various embodiments include an external injector application, a point cloud fusion application, a segmentation application, a bounding-box application, a QA node application, an HTTP interface application, and a status light application. Of course, in some embodiments, additional or alternative software applications may be stored in the memory of the computing device.

The external injector application is the transition point between the acquisition system, which creates a point cloud, and the backend system, which determines freight dimensions and communicates the results to the customer. The external injector performs any coordinate or unit conversions required to make the point cloud compliant with the backend dimensioning software and publishes the point cloud in the backend system so that the other programs can access it. The point cloud fusion application transforms multiple point clouds into a single coordinate system and combines the points into a single point cloud. In some instances, the point cloud fusion application transforms a single point cloud into a preferred back end coordinate system. The segmentation application separates the freight points from the rest of the scene. In some instances, the segmentation application also filters or resamples the point cloud. In turn, the bounding-box application constructs the minimum bounding box that for the segmented freight and determines the dimensions of the freight. The QA node application analyzes the conditions associated with the dimensioning operation, the segmented point cloud and the dimension result to identify errors (i.e., in order to determine if the dimensioning attempt was successful). The HTTP application communicates the results to an external system.

The status light application provides, via light tower device (an industrial indicator that has a stack of several different colored lights controlled by the status light application), visual feedback of the dimensioning system's readiness to perform a dimensioning operation and/or the status of the current dimensioning operation.

Figure 5:
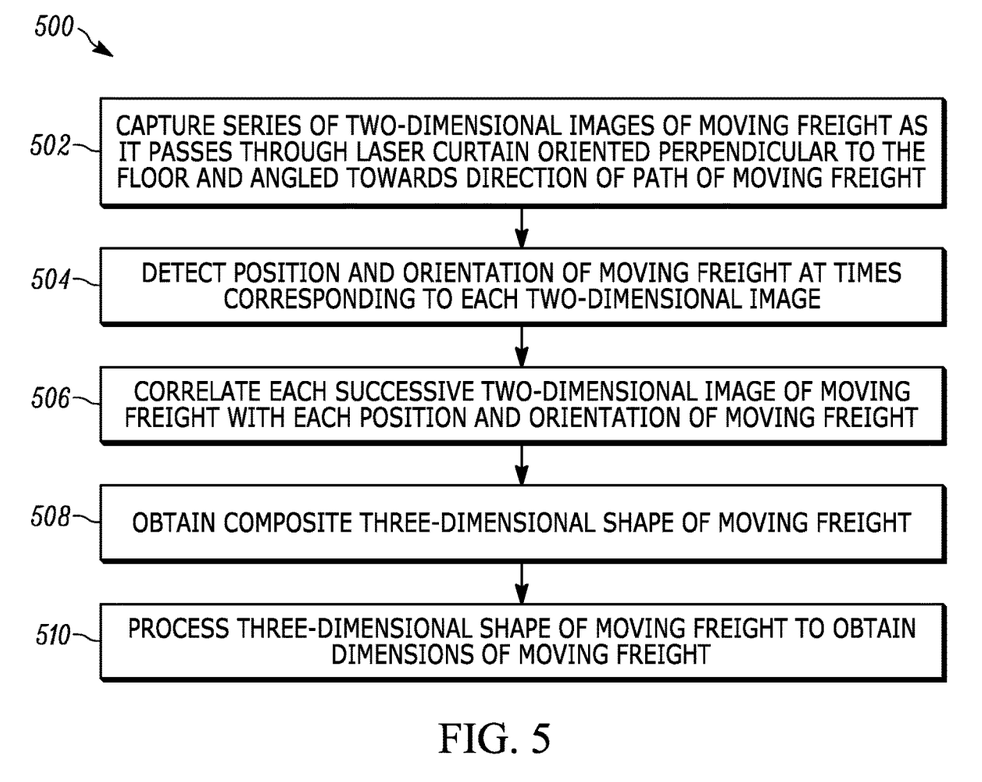
FIG. 5 is a flowchart representative of an example method for dimensioning a moving freight in motion along a path.

FIG. 5 is a flowchart of an example method 500 for dimensioning a moving freight in motion along a path. The method 500 can be implemented as a set of instructions stored on the computer-readable memory 404 and executable on one or more processors 406.

At block 502, a series of two-dimensional images of a moving freight are captured (e.g., by a camera) as the moving freight passes through a laser curtain oriented perpendicular to the floor and angled towards the direction of freight travel (i.e., a diagonal laser curtain). In some instances, the speed of the moving freight and angle of laser curtain to the path of the moving freight are known (e.g., when the path of the moving freight is constrained, and/or when the moving freight is transported by a conveyor belt system). However, in other instances in which the path of the moving freight is unconstrained (e.g., when the moving freight is being controlled by a human-operated forklift), the speed of the moving freight and/or the angle of the laser curtain to the path of the moving freight may not be known. In those instances, additional sensor data indicative of a plurality of successive positions, orientations, and/or speeds of the moving freight is captured (block 504). In some instances, this additional sensor data is captured by a positioning sensor, such as, e.g., another camera, a motion detector, etc. In some examples, a tracking indicator is affixed to (or painted on, printed on, etc.) the moving freight (or on the forklift or other mechanism transporting the moving freight), and the positioning sensor is configured to detect the position of the tracking indicator.

At block 506, each successive two-dimensional image of the moving freight is correlated with each position and orientation of the moving freight. That is, using the position and orientation of the moving freight, the angle of the diagonal laser curtain to the path of the freight, and the times when each of the successive two-dimensional images of the moving freight are captured, the successive two-dimensional images may be used to recreate the shape of the freight passing through the diagonal laser curtain, forming a composite three-dimensional shape of the freight.

For example, based on the plane of the laser curtain, the positions of the two-dimensional cameras capturing the laser curtain intersection with the freight, and the position and orientation of the freight at the time of each image capture, a three-dimensional coordinate can be determined for each pixel of each of the two-dimensional images. Each three-dimensional pixel coordinate represents a point in space where the laser intersected with the freight during the capture of the image. In particular, to determine three-dimensional pixel coordinates for a given image, the basis of the coordinate system is shifted from the previous image to account for changes in the position and/or orientation of the moving freight. For example, if the freight moves forward one inch in the x-direction between image captures, the basis of the coordinate system is shifted one inch in the x-direction to determine three-dimensional pixel coordinates for pixels associated with the subsequent image. As another example, if the freight turns 5 degrees towards the y-direction between image captures, the basis of the coordinate system is shifted 5 degrees in the y-direction to determine the three-dimensional pixel coordinates associated with the subsequent image.

Once a sufficient set of three-dimensional pixels have been mapped, the three-dimensional pixels not associated with the moving freight (e.g., pixels associated with portions of the floor or the forklift, etc.) are removed. For example, in some approaches, points are grouped and/or segmented according to proximity into clusters. For instance, with respect to separating the pixels associated with the floor from the pixels associated with the freight, the freight and floor points generally form different clusters when freight is held above the floor. As another example, with respect to separating the pixels associated with the forklift from the pixels associated with the freight, the pixels may be cut along a dividing line between the freight and the forklift. This dividing line is sometimes determined by locating fiducials mounted on the forklift (i.e., knowing the location in the point cloud of the fiducials allows the dividing line to be determined.)

Upon the removal of the three-dimensional pixels not associated with the moving freight, a minimum bounding box is fit onto the remaining freight pixels to obtain (block 508) a composite three-dimensional shape of the moving freight.

At block 510, the three-dimensional shape of the moving freight is processed to obtain dimensions of the moving freight. That is, using the composite three-dimensional shape of the moving freight, a height, length, and width of the moving freight are obtained. Additionally, using the height, length, and width of the moving freight, the volume of the moving freight may be obtained as well.

Figure 6:
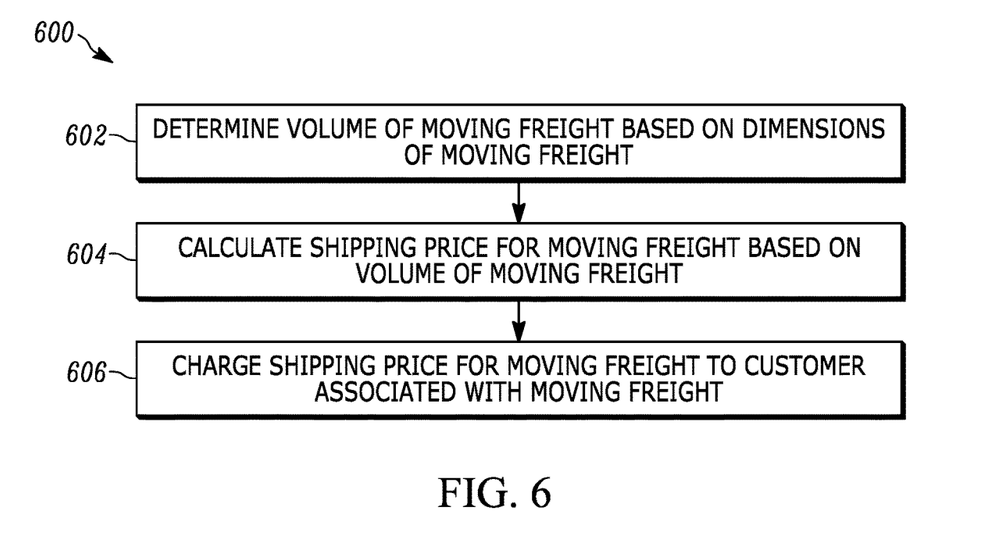
FIG. 6 is a flowchart representative of an example method for charging a shipping price for a moving freight to a customer associated with the moving freight.

FIG. 6 is a flowchart representative of an example method 600 for charging a shipping price for a moving freight to a customer associated with the moving freight. The method 600 can be implemented as a set of instructions stored on the computer-readable memory 404 and executable on one or more processors 406.

At block 602, the volume of the moving freight is determined based on the dimensions of the moving freight. That is, the volume of the freight is calculated using the length, width, and height of the composite three-dimensional shape of the freight.

At block 604, a shipping price for the moving freight is calculated based on the volume of the moving freight. That is, in one example, a shipper of the freight charges customers proportionally based on volume, e.g., $10 per cubic foot of freight. In some instances, the processor 412 accesses a database 416 via a network 414 to obtain the shipping price for the moving freight. In some examples, the shipping price of the moving freight is additionally or alternatively based on the weight of the freight, which may be inferred from the volume of the freight when the freight has contents with a known or expected weight. The known or expected weight of the contents of the freight may be stored in the database 416 as well in some embodiments. Moreover, in some examples, the shipping price of the moving freight is additionally or alternatively based on the specific type of freight (e.g., tires may ship at one price per volume or per weight, while engine parts may ship at a different price per volume or per weight, etc.)

At block 606, the calculated shipping price is charged to a customer associated with the moving freight. In some examples, the customer associated with a particular freight is identified, e.g., by identifying a label attached to the freight, and matching the information from the label with customer information stored in a database. For example, the database 416 stores customer information for each freight and corresponding label information for each freight. Accordingly, the identified customer is charged the calculated shipping price.

Figure 7:
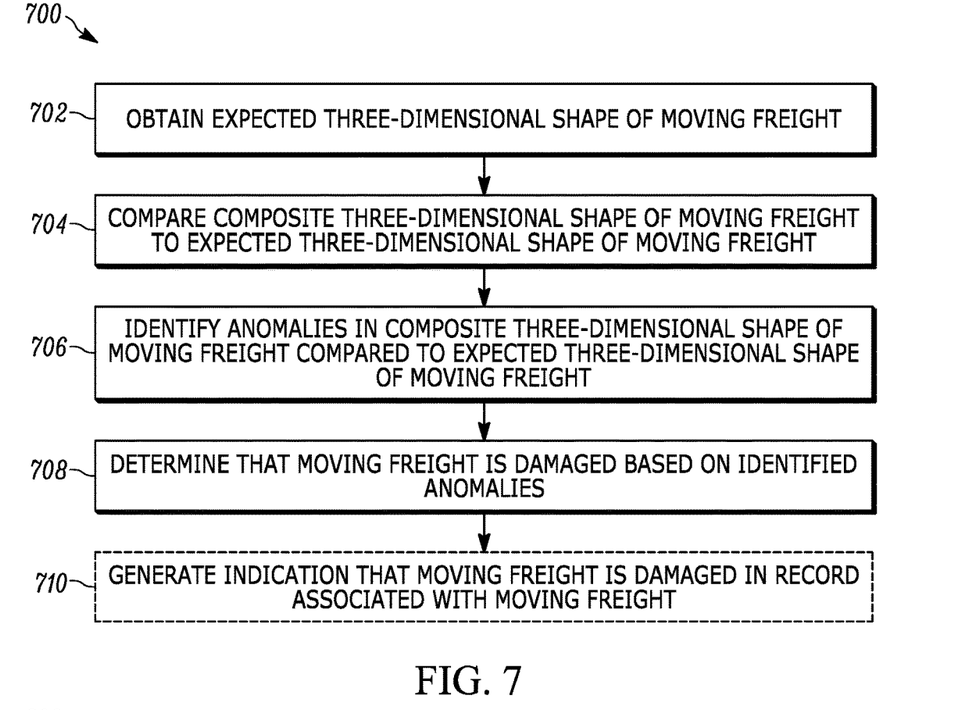
FIG. 7 is a flowchart representative of an example method for determining that a moving freight is damaged.

FIG. 7 is a flowchart representative of an example method 700 for determining that a moving freight is damaged. The method 700 can be implemented as a set of instructions stored on the computer-readable memory 404 and executable on one or more processors 406.

At block 702, an expected three-dimensional shape of the moving freight is obtained. In some instances, the processor 412 accesses a database 416 via a network 414 to obtain the expected three-dimensional shape of the moving freight. In some examples, a label attached to the freight is identified, and the information from the label is matched to an expected three-dimensional shape for the freight via the database. In other instances, the label itself includes an expected three-dimensional shape of the moving freight.

At block 704, the composite three-dimensional shape of the moving freight is compared to the expected three-dimensional shape of the moving freight. At block 706, anomalies in the composite three-dimensional shape of the moving freight compared to the expected three-dimensional moving freight are identified. Advantageously, through the use of the diagonal laser curtain, anomalies to all faces, edges, and corners of the freight can be detected. As an example, the composite three-dimensional shape of the moving freight includes a curved face where the expected three-dimensional shape of the freight includes a flat face. As another example, the composite three-dimensional shape of the moving freight includes a flattened edge where the expected three-dimensional shape of the freight includes a sharp corner. As still another example, the composite three-dimensional shape of the moving freight is different from the expected three-dimensional shape at a number of points greater than a threshold number.

At block 708, the moving freight is determined to be damaged based on the identified anomalies. In some instances, the processor 412 accesses a database 416 via a network 414 to determine that the moving freight is damaged. For example, the database 416 stores a listing of anomalies matched with a projected likelihood that a freight having the anomaly is damaged or not. As another example, the database 416 stores a listing of anomalies matched with a type of damage associated with each anomaly. As still another example, the database 416 stores a listing of anomalies matched with a severity of damage associated with each anomaly. These database listings are matched to identified anomalies to make a determination of damage, which may include, e.g., a likelihood that damage has occurred, a type of damage, and/or a severity of damage. Additionally or alternatively, in some instances, the processor 412 accesses the database 416 or another suitable database via a network 414 to determine that a theft related to the moving freight has occurred (e.g., some of the contents of the moving freight have been stolen, causing the shape of the moving freight to change). For example, the database 416 stores a listing of anomalies matched with a projected likelihood that a theft related to the moving freight has occurred.

At block 710, an indication is generated in a record associated with the moving freight, indicating that the moving freight is damaged. In some instances, the indication includes a type of anomaly, the likelihood that damage has occurred, a type of damage, and/or a severity of damage. In some instances, a notification is generated for a customer associated with the damaged freight, indicating that the moving freight is damaged.

Figure 8:
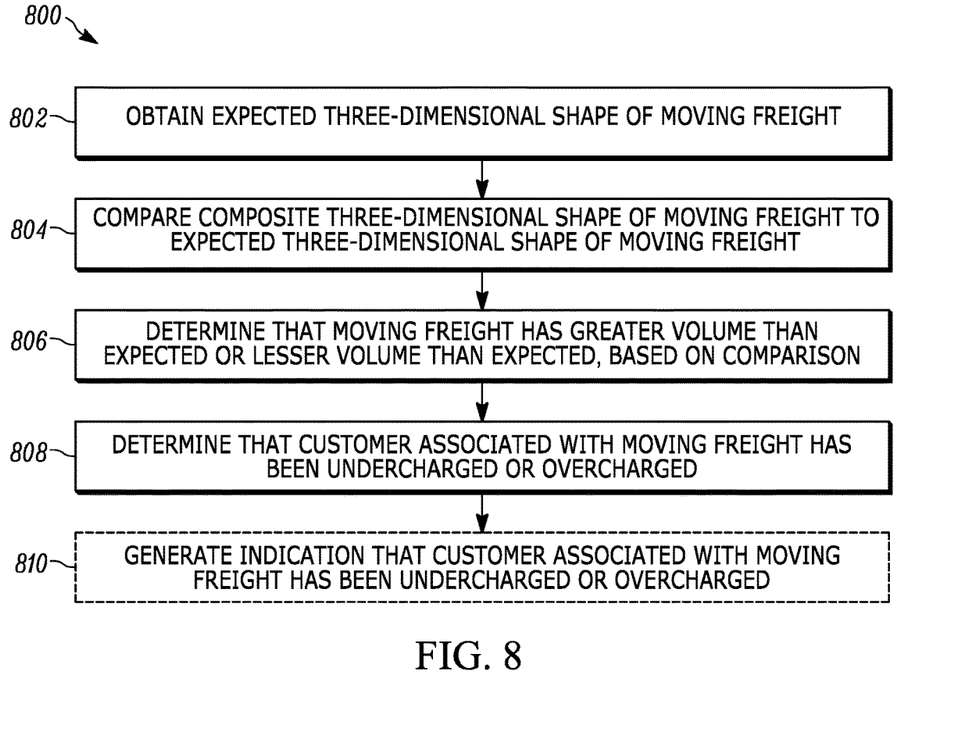
FIG. 8 is a flowchart representative of an example method for determining that a customer associated with a moving freight has been undercharged or overcharged for shipping the moving freight.

FIG. 8 is a flowchart representative of an example method 800 for determining that a customer associated with a moving freight has been undercharged or overcharged for shipping the moving freight. The method 800 can be implemented as a set of instructions stored on the computer-readable memory 404 and executable on one or more processors 406.

At block 802, an expected three-dimensional shape of the moving freight is obtained. In some instances, the processor 412 accesses a database 416 via a network 414 to obtain the expected three-dimensional shape of the moving freight. In some examples, a label attached to the freight is identified, and the information from the label is matched to an expected three-dimensional shape for the freight via the database. In other instances, the label itself includes an expected three-dimensional shape of the moving freight.

At block 804, the composite three-dimensional shape of the moving freight is compared to the expected three-dimensional shape of the moving freight. At block 806, the moving freight is determined to have a greater or lesser volume than expected, based on the comparison of the composite three-dimensional shape of the moving freight to the expected three-dimensional shape of the moving freight. For example, the expected three-dimensional shape of the moving freight has a volume of one cubic foot, while the composite three-dimensional shape of the moving freight has a volume of two cubic feet. As another example, the expected three-dimensional shape of the moving freight has a volume of one cubic foot, while the composite three-dimensional shape of the moving freight has a volume of half a cubic foot.

At block 808, a customer associated with the moving freight is determined to have been undercharged or overcharged. That is, when the moving freight is determined to have a volume that is greater than expected, the customer associated with the moving freight has likely been undercharged. On the other hand, when the moving freight is determined to have a volume that is less than expected, the customer associated with the moving freight has likely been undercharged. At block 810, an indication is generated, indicating that the customer associated with the moving freight has been undercharged or overcharged. In some instances, the indication is added to a record associated with the moving freight or associated with the customer. Furthermore, in some instances, a notification is generated for the customer indicating that the customer has been undercharged or overcharged.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combine, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

We claim:

1. A dimensioning system for dimensioning a moving freight in motion along a path, the dimensioning system comprising:
a laser curtain system comprising:
a plurality of laser line generators, each configured to emit coplanar laser beams forming a laser curtain, the laser curtain oriented perpendicular to the floor and angled towards the direction of the path of the moving freight;
a camera configured to capture a series of two-dimensional images of the moving freight as the moving freight passes through the laser curtain; and
a positioning sensor configured to detect a position and orientation of the moving freight at times corresponding to each two-dimensional image;
memory configured to store computer executable instructions; and
a processor configured to interface with the laser curtain system and the memory, and configured to execute the computer executable instructions to cause the processor to:
based at least in part on the appearance of laser light in each of the each two- dimensional images, correlate each successive two-dimensional image of the moving freight with each position and orientation of the moving freight to obtain a composite three-dimensional shape of the moving freight; and
process the composite three-dimensional shape of the moving freight to dimension the moving freight.

2. The dimensioning system of claim 1, wherein the computer executable instructions, when executed, cause the processor to:
determine, based on the dimensions of the moving freight, a volume of the moving freight;
calculate, based on the volume of the moving freight, a shipping price for the moving freight; and
charge the shipping price for the moving freight to a customer associated with the moving freight.

3. The dimensioning system of claim 1, wherein the computer executable instructions, when executed, cause the processor to:
compare the composite three-dimensional shape of the moving freight to an expected three-dimensional shape of the moving freight;
identify one or more anomalies in the composite-three dimensional shape of the moving freight compared to the expected three-dimensional shape of the moving freight; and
determine, based on the identified anomalies, that the moving freight is damaged.

4. The dimensioning system of claim 3, wherein the computer executable instructions, when executed, cause the processor to:
generate an indication that the moving freight is damaged in a record associated with the moving freight.

5. The dimensioning system of claim 1, wherein the computer executable instructions, when executed, cause the processor to:
compare the composite three-dimensional shape of the moving freight to an expected three-dimensional shape of the moving freight; and
determine, based on the comparison, that the moving freight has a greater volume than expected; and
generate, based on determining that the moving freight has a larger volume than expected, an indication that a customer associated with the moving freight has been undercharged for shipping the freight.

6. The dimensioning system of claim 1, wherein the computer executable instructions, when executed, cause the processor to:
compare the composite three-dimensional shape of the moving freight to an expected three-dimensional shape of the moving freight; and determine, based on the comparison, that the moving freight has a smaller volume than expected; and
generate an indication, based on determining that the moving freight has a smaller volume than expected, an indication that a customer associated with the moving freight has been overcharged for shipping the freight.

7. The dimensioning system of claim 1, wherein the laser curtain is angled at a 45-degree angle to the direction of the path of the moving freight.

8. The dimensioning system of claim 1, wherein the laser curtain is angled at an angle between 30 degrees and 60 degrees, inclusive, to the direction of the path of the moving freight.

9. A computer-implemented method of dimensioning a moving freight in motion along a path, the method comprising:
obtaining a series of two-dimensional images of a moving freight as the moving freight passes through a laser curtain oriented perpendicular to the floor and angled towards the direction of the path of the moving freight, the laser curtain comprising coplanar laser beams emitted by a plurality of laser line generators;
determining a position and orientation of the moving freight at times corresponding to each two-dimensional image;
based at least in part on the appearance of laser light in each of the each two-dimensional images, correlating, by a processor, each successive two-dimensional image of the moving freight with each position and orientation of the moving freight to obtain a composite three-dimensional shape of the moving freight; and
processing, by the processor, the composite three-dimensional shape of the moving freight to dimension the moving freight.

10. The method of claim 9, further comprising:
determining, by the processor, based on the dimensions of the moving freight, a volume of the moving freight;
calculating, by the processor, based on the volume of the moving freight, a shipping price for the moving freight; and
charging, by the processor, the shipping price for the moving freight to a customer associated with the moving freight.

11. The method of claim 9, further comprising:
comparing, by the processor, the composite three-dimensional shape of the moving freight to an expected three-dimensional shape of the moving freight;
identifying, by the processor, one or more anomalies in the composite-three dimensional shape of the moving freight compared to the expected three-dimensional shape of the moving freight; and
determining, by the processor, based on the identified anomalies, that the moving freight is damaged.

12. The method of claim 11, further comprising:
generating, by the processor, an indication that the moving freight is damaged in a record associated with the moving freight.

13. The method of claim 9, further comprising:
comparing, by the processor, the composite three-dimensional shape of the moving freight to an expected three-dimensional shape of the moving freight; and
determining, by the processor, based on the comparison, that the moving freight has a greater volume than expected; and
generating, by the processor, based on determining that the moving freight has a larger volume than expected, an indication that a customer associated with the moving freight has been undercharged for shipping the freight.

14. The method of claim 9, further comprising:
comparing, by the processor, the composite three-dimensional shape of the moving freight to an expected three-dimensional shape of the moving freight; and
determining, by the processor, based on the comparison, that the moving freight has a smaller volume than expected; and
generating, by the processor, based on determining that the moving freight has a smaller volume than expected, an indication that a customer associated with the moving freight has been overcharged for shipping the freight.

15. The method of claim 9, wherein the laser curtain is angled at a 45-degree angle to the direction of the path of the moving freight.

16. The method of claim 9, wherein the laser curtain is angled at an angle between 30 degrees and 60 degrees, inclusive, to the direction of the path of the moving freight.

17. A tangible machine-readable medium having machine-readable instructions stored thereon that, when executed by a processor, cause a system to at least :
capture a series of two-dimensional images of a moving freight as the moving freight passes through a laser curtain oriented perpendicular to the floor and angled towards the direction of the path of the moving freight, the laser curtain comprising coplanar laser beams emitted by a plurality of laser line generators;
detect a position and orientation of the moving freight at times corresponding to each two-dimensional image;
based at least in part on the appearance of laser light in each of the each two-dimensional images, correlate each successive two-dimensional image of the moving freight with each position and orientation of the moving freight to obtain a composite three-dimensional shape of the moving freight; and
process the composite three-dimensional shape of the moving freight to dimension the moving freight.

18. The tangible machine-readable medium of claim 17, wherein the instructions, when executed, cause the system to:
determine, based on the dimensions of the moving freight, a volume of the moving freight;
calculate, based on the volume of the moving freight, a shipping price for the moving freight; and
charge the shipping price for the moving freight to a customer associated with the moving freight.

19. The tangible machine-readable medium of claim 17, wherein the instructions, when executed, cause the system to:
compare the composite three-dimensional shape of the moving freight to an expected three-dimensional shape of the moving freight;
identify one or more anomalies in the composite-three dimensional shape of the moving freight compared to the expected three-dimensional shape of the moving freight; and
determine based on the identified anomalies, that the moving freight is damaged.

20. The tangible machine-readable medium of claim 17, wherein the instructions, when executed, cause the system to:
compare the composite three-dimensional shape of the moving freight to an expected three-dimensional shape of the moving freight; and determine, based on the comparison, that the moving freight has a greater volume than expected; and generate, based on determining that the moving freight has a larger volume than expected, an indication that a customer associated with the moving freight has been undercharged for shipping the freight.

\* \* \* \* \*